No. 884,213. PATENTED APR. 7, 1908.
F. M. SCHMIDT.
COMBINED FAN AND FLY CATCHER.
APPLICATION FILED JUNE 24, 1907.
2 SHEETS—SHEET 1.
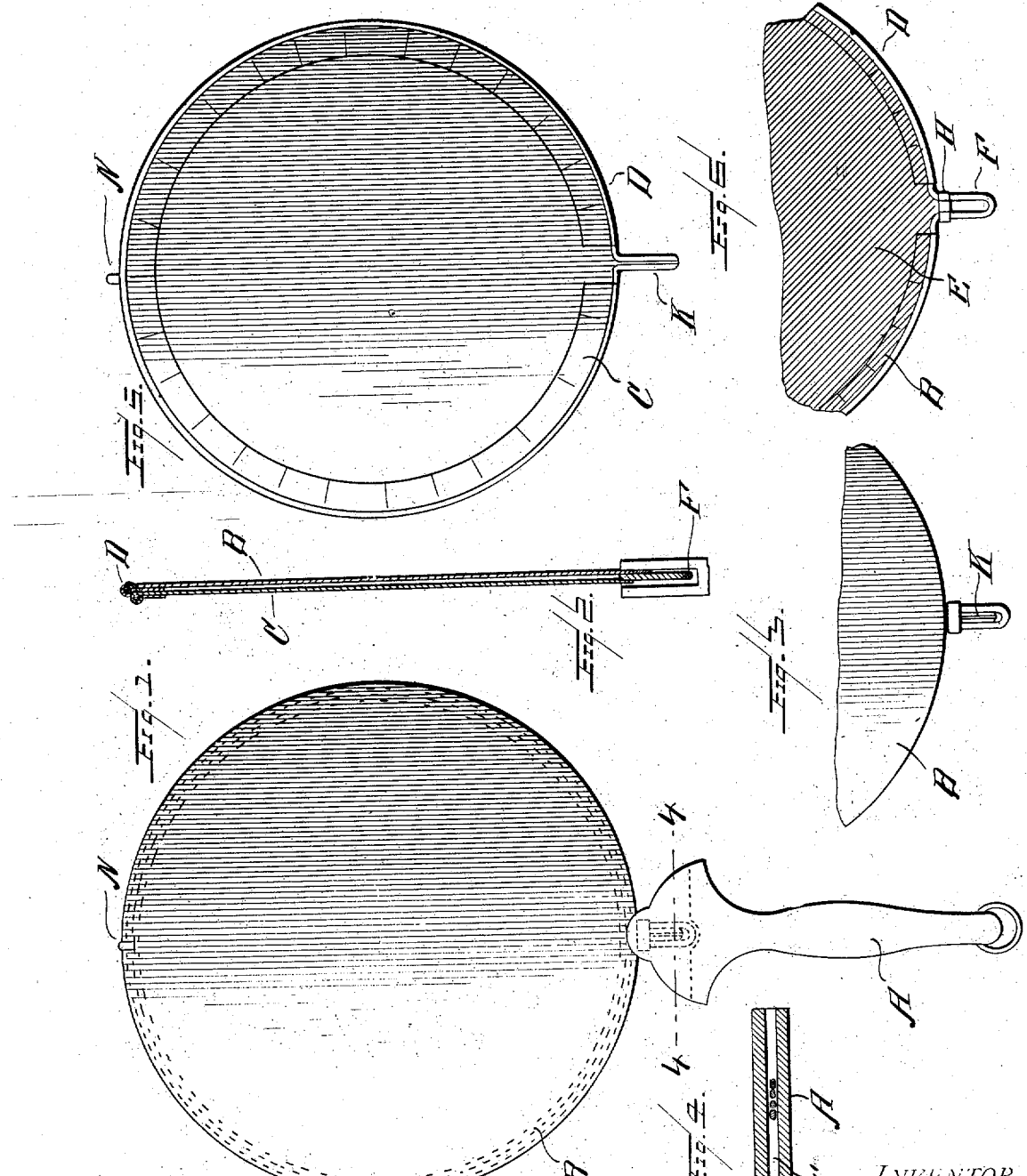
WITNESSES
INVENTOR
F. M. Schmidt,
BY Franklin N. Hough
Attorney

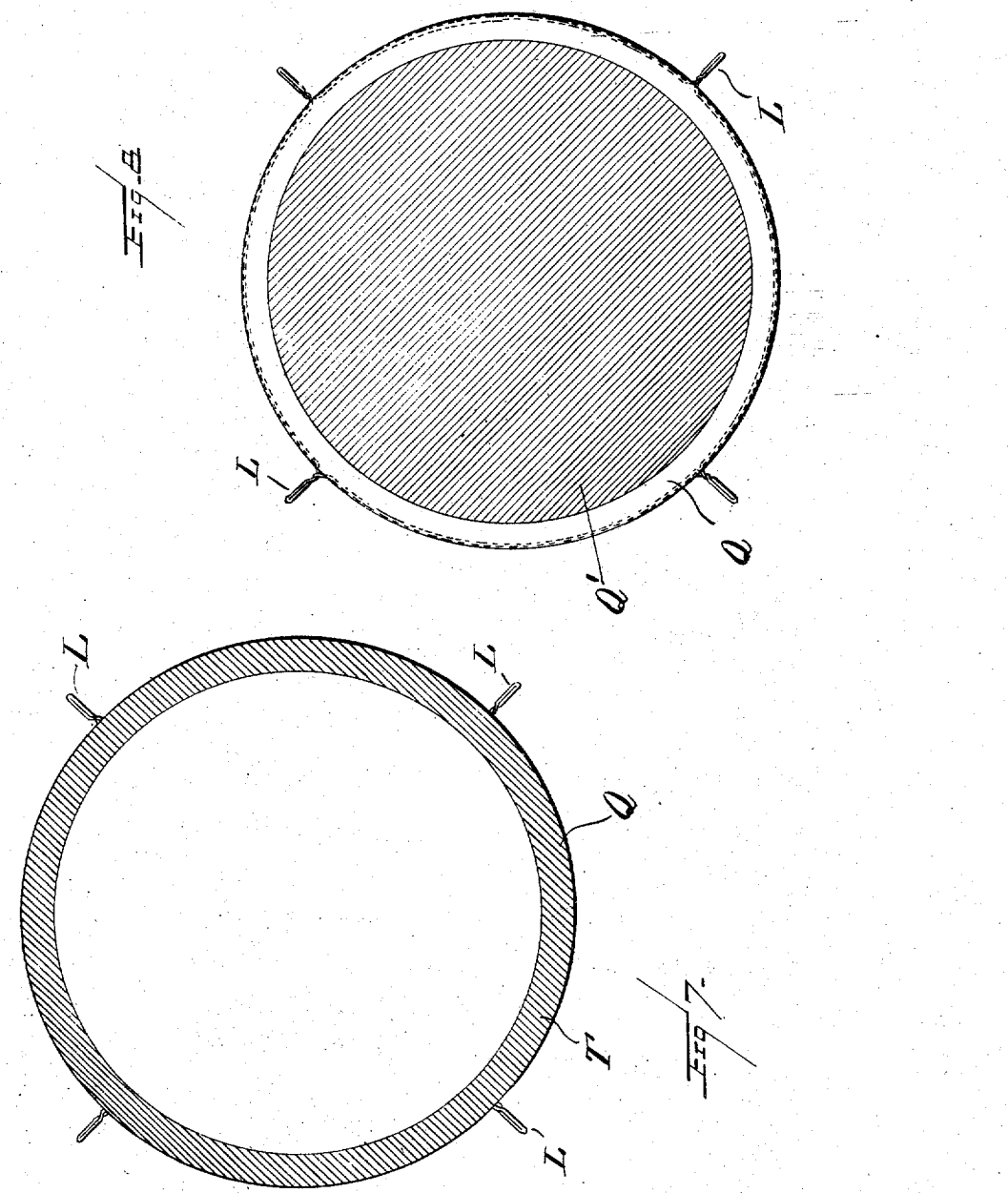

UNITED STATES PATENT OFFICE.

FRANK M. SCHMIDT, OF JACKSONVILLE, FLORIDA.

COMBINED FAN AND FLY-CATCHER.

No. 884,213.

Specification of Letters Patent.

Patented April 7, 1908.

Application filed June 24, 1907. Serial No. 380,554.

*To all whom it may concern:*

Be it known that I, FRANK M. SCHMIDT, a citizen of the United States, residing at Jacksonville, in the county of Duval and State of Florida, have invented certain new and useful Improvements in a Combined Fan and Fly-Catcher; and I do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful improvements in combined fans and fly trap and the object of the invention is to produce a simple and efficient device of this nature, comprising essentially one or more disks having an adhesive material coating upon one face thereof, the two disks being adapted to be placed with the sticky coated surface toward each other and detachably held upon a handle.

The invention consists further in the provision of a device of this nature in which one or more disks having each a surface coated with a sticky material and which may be separated and used singly or together, each being adapted to be held to a separate handle or one applied to a handle and the other adapted to be hung up or placed upon any object presenting a surface to attract and capture flies.

The invention comprises various details of construction and combinations and arrangements of parts which will be hereinafter fully described and then specifically defined in the appended claims.

My invention is illustrated in the accompanying drawings, in which:—

Figure 1 is a side elevation showing my combined fan and fly trap as adjusted to a handle. Fig. 2 is a sectional view through the device. Fig. 3 is a side elevation of the lower portion of the disks which form the fan, shown as detached from their handle. Fig. 4 is a sectional view on line 4—4 of Fig. 1. Fig. 5 is a detailed view of one of the disks showing a shank portion which engages the loop in the marginal edge of the other disk. Fig. 6 is a detailed view of one of the disks showing the loop to receive the shank of the other disk. Fig. 7 is a detailed view of a slight modification of one of the disks which is shown as having wires projecting from the circumference thereof and adapted to engage over the marginal edge of the disk which is to be held by a handle, said view showing a marginal coating of adhesive material whereby the disk may be further held to the second disk, and Fig. 8 is a reverse view of the disk shown in Fig. 7.

Reference now being had to the details of the drawings by letter, A designates a handle having a transverse slot A' formed in its upper widened end, as shown in the sectional view Fig. 4.

B and C designate two disks made preferably of paper and each having a marginal wire D about its edge, said disks shown clearly in Figs. 5 and 6 of the drawings. Each of said disks B and C is adapted to have a face thereof coated with an adhesive fly catching material, designated in the drawings by the shading E.

Upon reference to Fig. 6 of the drawings, it will be seen that the wire which forms the marginal edge of the disk B is turned into the loop F with a space intervening between the edge thereof, the arms of said loop being connected together by a link H and that the wire which forms the marginal edge of the disk C has its ends brought together forming a shank portion K, which is of such a size as to enter the space between the marginal edges of the loop F, as shown clearly in Figs. 3 and 4. The diameter of the disk C is slightly smaller than the diameter of the disk B, whereby the disk C may rest inside the wire about the marginal edge of the disk B. Projecting from the disk C is a resilient finger N which is provided to engage over the wire forming the marginal edge of the disk B, as shown in Fig. 1 of the drawings, thereby forming means whereby the two disks may be securely held together.

Referring to Figs. 7 and 8 of the drawings will be seen an additional disk designated by letter Q, which may be attached to one or the other of the disks B or C. Said disk Q is provided with a sticky substance Q', which surface is adapted to attract and catch flies and upon its opposite edge, as shown in Fig. 7 of the drawings, is a marginal rim of mucilage designated by letter T. Wire fingers L project from the edge of the disk Q and are adapted to be bent over the wire forming the marginal edge of one or the other of the disks B and C. Said margin of mucilage designated by letter T is provided to coöperate with the wire fingers to cause the two disks to be securely held together.

In operation, when the device is utilized as a fan, the two disks B and C are placed together, as shown in Fig. 3 of the drawings, with the shank portions thereof as illustrated and inserted in the handle A. When it is desired to utilize the fan for catching flies, the disk C may be removed from the handle and the disk B utilized both as a fan and having one surface with adhesive material exposed to contact with and catch flies while it is being utilized as a fan. The disk C, when it is removed from the handle, may be placed upon any object with its surface of adhesive material exposed to form additional means for catching the flies. The disks Q are a separate device and are adapted to be held two together with their adhesive faces toward each other and, when it is desired to attach one of the disks Q to the face of the disk B with its surface of adhesive material outward, it may be readily done by bending the fingers over the wire forming the marginal edge of the disk B and also moistening the mucilage strip T, causing further means for securely holding the two disks together.

It will thus be seen from the foregoing that, by the provision of the means shown and described, a simple and efficient means is afforded whereby the disks when not in use may be utilized as an ordinary fan and, in the event of flies being troublesome, the adhesive surface of one or the other of the disks may be exposed for their capture and, if desired, the extra disk, which is not attached to the handle, may be placed at any convenient location where the adhesive surface thereof will form additional means for capturing the flies.

What I claim is:—

1. A combined fan and fly trap, comprising a plurality of disks each having a surface of adhesive material, each of said disks having a shank portion adapted to interlock one with the other, and a handle engaged by said shank portion, as set forth.

2. A combined fan and fly trap, comprising a plurality of disks each having a surface of adhesive material, each disk having a wire forming a marginal edge thereof, said wire being bent to form shank portions which are adapted to interlock, and a handle having a slotted end for the reception of said shank portion, as set forth.

3. A combined fan and fly trap, comprising a plurality of disks each having a surface of adhesive material, each disk having a wire forming the marginal edge thereof, one of said wires being bent to form a loop with a link connecting the same, the other disk having a shank portion adapted to rest within the said loop and a handle having a slotted end for the reception of said shanks, as set forth.

4. A combined fan and fly trap, comprising a plurality of disks each having a surface of adhesive material, each disk having a wire forming the marginal edge thereof, one of said wires being bent to form a loop with a link connecting the same, the other disk having a shank portion adapted to rest within the said loop, a handle having a slotted end for the reception of said shanks, and means for fastening the edges of the disks together, as set forth.

In testimony whereof I hereunto affix my signature in the presence of two witnesses.

FRANK M. SCHMIDT.

Witnesses:
A. L. HOUGH,
FRANKLIN H. HOUGH.